(12) United States Patent
Chen et al.

(10) Patent No.: US 7,436,560 B2
(45) Date of Patent: Oct. 14, 2008

(54) DISPLAY DEVICE FOR A VEHICLE

(75) Inventors: Pao Chen, Milpitas, CA (US); Sven Strohband, Mountain View, CA (US); Cedric Dupont, San Francisco, CA (US); Derek Pai, San Francisco, CA (US); Brian Ng, Los Altos, CA (US); Arne Stoschek, Palo Alto, CA (US)

(73) Assignee: Volkswagen AG, Wolfsburg (DE)

( * ) Notice: Subject to any disclaimer, the term of this patent is extended or adjusted under 35 U.S.C. 154(b) by 383 days.

(21) Appl. No.: 11/323,917

(22) Filed: Dec. 30, 2005

(65) Prior Publication Data

US 2006/0171007 A1    Aug. 3, 2006

Related U.S. Application Data

(60) Provisional application No. 60/640,292, filed on Dec. 30, 2004.

(51) Int. Cl.
*G03H 1/00* (2006.01)
(52) U.S. Cl. .............................. 359/13; 359/15; 359/22
(58) Field of Classification Search ................... 359/13, 359/14
See application file for complete search history.

(56) References Cited

U.S. PATENT DOCUMENTS

| | | | |
|---|---|---|---|
| 4,978,196 A | 12/1990 | Suzuki et al. ............... 350/174 |
| 5,859,714 A * | 1/1999 | Nakazawa et al. ............ 359/13 |
| 6,757,087 B1 * | 6/2004 | Taketomi et al. ............. 359/32 |
| 6,791,511 B2 | 9/2004 | Eschler et al. ................. 345/8 |
| 2006/0066508 A1 * | 3/2006 | Walck et al. .................... 345/7 |
| 2007/0019264 A1 * | 1/2007 | Tanijiri et al. ................. 359/15 |

FOREIGN PATENT DOCUMENTS

| | | | | |
|---|---|---|---|---|
| DE | 3712663 | 10/1988 | | |
| DE | 3812650 | 11/1988 | | |
| DE | 4211728 | 10/1993 | | |
| DE | 19961572 | 7/2001 | | |
| DE | 10227468 | 1/2004 | | |
| JP | 11038506 | 2/1999 | | |
| WO | WO02/058402 | * | 7/2002 | ................ 345/7 |
| WO | 2004001483 | 12/2003 | | |

\* cited by examiner

*Primary Examiner*—Fayez G Assaf
(74) *Attorney, Agent, or Firm*—Baker Botts L.L.P.

(57) ABSTRACT

A display device for a vehicle includes a transparent window with a light emission layer intended to separate the interior of the vehicle for emitting visible light when light is beamed onto the light emission layer, a light source for beaming light onto the window, a reflector mounted in a light path between the light source and the window to reflect the light generated by the light source and an adjustable image generator located between the light source and the reflector.

16 Claims, 6 Drawing Sheets

DISPLAY DEVICE FOR A VEHICLE

CROSS-REFERENCE TO RELATED APPLICATIONS

This application claims the benefit of U.S. Provisional Application No. 60/640,292 filed on Dec. 30, 2004, entitled "DISPLAYANORDNUNG FÜR EIN FAHRZEUG", which is incorporated herein by reference in its entirety.

TECHNICAL FIELD

The invention concerns a display device for a vehicle to display data and/or images on a window separating the interior of the vehicle. The invention also concerns a motor vehicle whereby data and/or images can be displayed on the windshield of the vehicle.

BACKGROUND

The use of so-called head-up displays (HUD) is known for displaying data on the windshield of a motor vehicle. In doing so it is possible to apply an electroluminescent layer on or in the windshield for displaying data or graphic elements concerning the motor vehicle. It is also possible to project data or graphic elements onto the windshield in such a way that the windshield reflects the displayed data or the graphic elements concerning the motor vehicle.

A display system for displaying data on the windshield of a motor vehicle via a fluorescent layer applied to the windshield is known from WO 02/058402 (incorporated by reference).

Display systems are known from WO 90/07766 and WO 02/19020.

SUMMARY

The purpose of the invention is to improve the display of data and images in a vehicle, in particular a motor vehicle.

The above purpose can be achieved by a display device for vehicles that includes a transparent window intended to separate the interior of the vehicle, with a light emission layer for emitting visible light when light is beamed onto the light emission layer, a light source for beaming light onto the window, a reflector mounted in a light path between the light source and the window to reflect the light generated by the light source and an adjustable image generator mounted in the light path between the light source and the reflector.

A light emission layer as contemplated by the invention is especially a fluorescent layer. Such a fluorescent layer may be for example a base layer doped with a fluorescent red, green and/or blue dye, made e.g. of polyvinyl butyral (PVB), polyurethane (PU) or mylar. A light emission layer as contemplated by the invention may also be a stack of fluorescent layers. Such a stack may for example include a base layer doped with a fluorescent red dye, made e.g. of polyvinyl butyral (PVB), polyurethane (PU) or mylar, followed by a base layer doped with a fluorescent green dye, made e.g. of polyvinyl butyral (PVB), polyurethane (PU) or mylar and followed by a base layer doped with a fluorescent blue dye, made e.g. of polyvinyl butyral (PVB), polyurethane (PU) or mylar.

An adjustable image generator as contemplated by the invention may be an adjustable reflector or an adjustable refractor. Such a refractor as contemplated by the invention may be a so-called photonic crystal or a switchable Bragg grid. Suitable refractors may for example be purchased from POC Physical Optics Corporation (www.poc.com).

In one embodiment of the invention the light path between the adjustable image generator and the light emission layer is not less than 0.5 m.

In another embodiment of the invention an image with an area of more than 50 cm$^2$, especially more than 0.1 m$^2$ can be generated on the window.

In another embodiment of the invention the reflector is mounted at a distance of at least 0.25 m from the adjustable image generator.

In another embodiment of the invention the reflector is mounted at a distance of at least 0.25 m from the light emission layer.

In another embodiment of the invention the display device is configured in such a way that essentially invisible light, especially UV light, can be beamed from the light source onto the light emission layer.

In this case the proportion of light in the visible range is especially less than 1%. It is also possible to ensure that the light source generates such light or that other light components are filtered out or diverted.

In another embodiment of the invention the window includes a layer with holographic gratings applied to the side of the light emission layer facing the interior of the vehicle. This layer is polymer in another embodiment of the invention.

The above purpose can also be achieved by a motor vehicle that includes a windshield with a light emission layer for emitting visible light when light is beamed on the light emission layer, a light source for beaming light onto the windshield, a reflector mounted in a light path between the light source and the windshield to reflect light generated by the light source and an adjustable image generator mounted in the light path between the light source and the reflector, whereby the sum of the distance between the adjustable image generator and the reflector and the distance between the reflector and the light emission layer is not less than 0.5 m.

In another embodiment of the invention an image can be generated on the windshield that has an area of more than 50 cm$^2$, especially more than 0.1 m$^2$.

In another embodiment of the invention an image can be generated on the wind shield covering essentially an area of the windshield visible to a passenger or the driver of the motor vehicle.

In another embodiment of the invention essentially invisible light, especially UV light, can be beamed from the light source onto the light emission layer. In such a case the proportion of light in the visible area is especially less than 1%. In the process it is possible to ensure that the light source generates such light or that other light components are filtered out or diverted.

In another embodiment of the invention the windshield includes a layer with holographic gratings applied to the side of the light emission layer facing the interior of the motor vehicle. This layer is polymer in another embodiment of the invention.

The above purpose can also be achieved by a motor vehicle that has a windshield with a light emission layer for emitting visible light when light is beamed on the light emission layer and a projection arrangement suitable for projecting an image onto the area of the windshield visible essentially to a passenger or the driver of the motor vehicle.

In one embodiment of the invention the projection arrangement includes a light source for generating light. In another embodiment of the invention the projection arrangement includes a reflector to reflect light generated by the light source. In another embodiment of the invention the projection arrangement includes an adjustable image generator mounted especially between the light source and the reflector.

In another embodiment of the invention essentially invisible light, especially UV light may be beamed from the light source onto the light emission layer. In this case the proportion of light in the visible area is especially less than 1%. It is also possible to ensure that the light source generates such light or that other light components are filtered out or diverted.

In another embodiment of the invention the windshield includes a layer with holographic gratings applied to the side of the light emission layer facing the interior of the motor vehicle. This layer is polymer in another embodiment of the invention.

The above purpose can also be achieved by a motor vehicle that has a windshield with a light emission layer for emitting visible light when light is beamed onto the light emission layer and a projection arrangement suitable for projecting an image with an area of more than 50 cm$^2$, especially more than 0.1 m$^2$, onto the light emission layer.

In another embodiment of the invention the projection arrangement includes a light source for generating light. In another embodiment of the invention the projection arrangement includes a reflector to reflect light generated by the light source.

In another embodiment of the invention the projection arrangement includes an adjustable image generator mounted in particular between the light source and the reflector.

In another embodiment of the invention essentially invisible light, in particular UV light, may be beamed from the light source onto the light emission layer. In this case the proportion of light in the visible area is specifically less than 1%. It is also possible to ensure that the light source generates such light or that other light components are filtered out or diverted.

In another embodiment of the invention the windshield includes a layer with holographic gratings applied to the side of the light emission layer facing the interior of the motor vehicle. This layer is polymer in another embodiment of the invention.

Motor vehicles as contemplated by the invention can be in particular terrestrial vehicles that can be used individually in road traffic. The motor vehicles as contemplated by the invention are specifically not limited to terrestrial vehicles with combustion motors.

Other advantages and details are shown in the following description of examples of embodiment, whereby the same numbers refer to the same or similar elements or layers.

DETAILED DESCRIPTION

Figure 1:
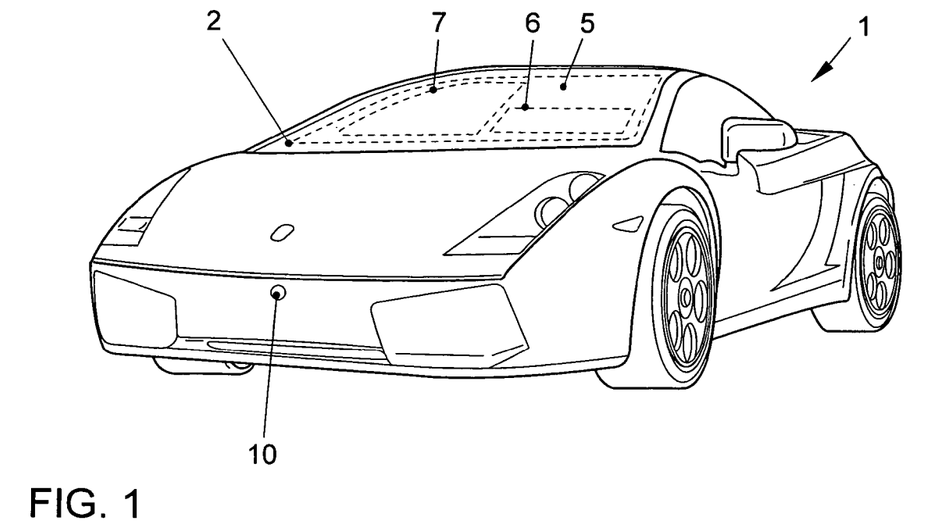
FIG. 1 shows an example of embodiment of a motor vehicle in a perspective front view.
Figure 2:
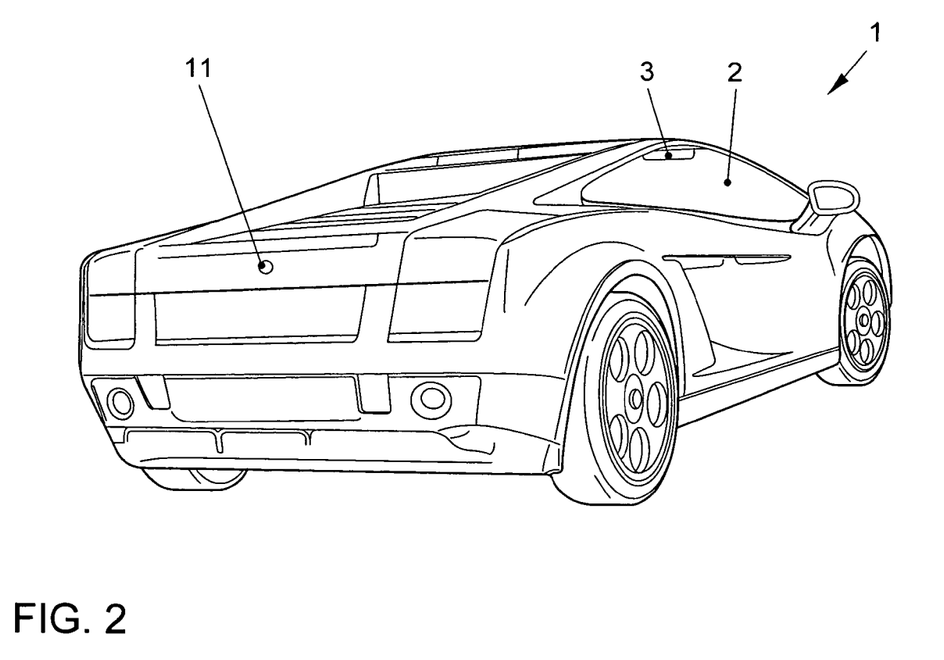
FIG. 2 shows the motor vehicle according to FIG. 1 in a perspective rear view.

FIG. 1 shows an example of embodiment of a motor vehicle 1 in a perspective front view and FIG. 2 shows the motor vehicle 1 according to FIG. 1 in a perspective rear view. The number 2 refers to a windshield and the number 3 to a rear mirror.

Figure 3:
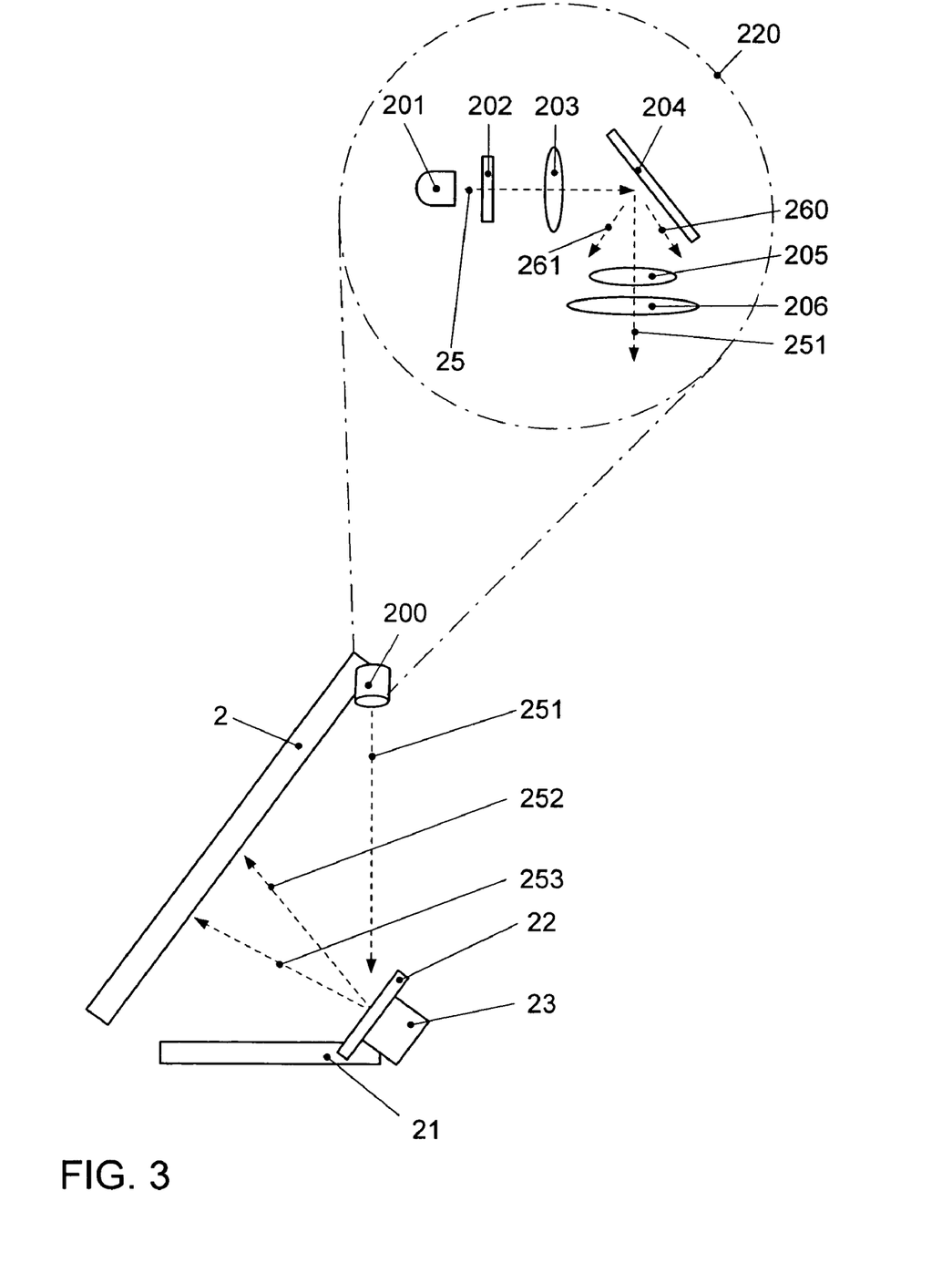
FIG. 3 shows an example of embodiment of a display device in a basic view.

The motor vehicle 1 includes a display device shown in FIG. 3 in a basic view for displaying data and/or images on the windshield 2, especially in an area of the windshield 2 referred to by number 5, in an area of the windshield 2 referred to by number 6 and in an area of the windshield 2 referred to by number 7. In the process an image with an area of more than 50 cm$^2$, specifically more than 0.1 m$^2$, can be generated on the windshield 2 with the display device shown in FIG. 3. In one embodiment an image can be generated on the windshield 2 with the display device shown in FIG. 3 that is essentially visible to a passenger or the driver of the motor vehicle in the area 5 of the windshield 2.

The display device includes a projector 200 mounted between the windshield 2 and the rear mirror 3—not shown in FIG. 3—for generating an image. The projector 200 shown in detail in a dotted circle referred to by number 220 includes a broadband light source 201 (wave length from 200 nm to 1,600 nm) such as a xenon or mercury lamp a light-reflecting DLP processor 204 to reflect light (indicated by a light path referenced with 251) or to neutralize light (indicated by the referenced light paths 260 and 261) using micro mirrors, whereby an image can be generated with the DLP processor 204 with the light generated by the broadband light source 201 by moving the micro mirrors accordingly, an optical band filter 202 mounted in a light path 25 between the broadband light source 201 and the DLP processor 204 that filters out visible light and infrared light, a front focal lens 203 mounted in the light path 25 between the broadband light source 201 and the DLP processor 204, and two projection lenses referenced by numbers 205 and 206.

The light-reflecting DLP processor 204 is an example of embodiment for an adjustable image generator as contemplated by the patent claims.

The display device includes a reflector 22 mounted in a light path 25, 251, 252 or 25, 251, 253 that can be adjusted by a micro controller 23 in such a way that the position of an image on the windshield 2 can be adjusted with the reflector 22. The number 21 in FIG. 3 refers to the instrument panel of the motor vehicle 1.

Figure 4:
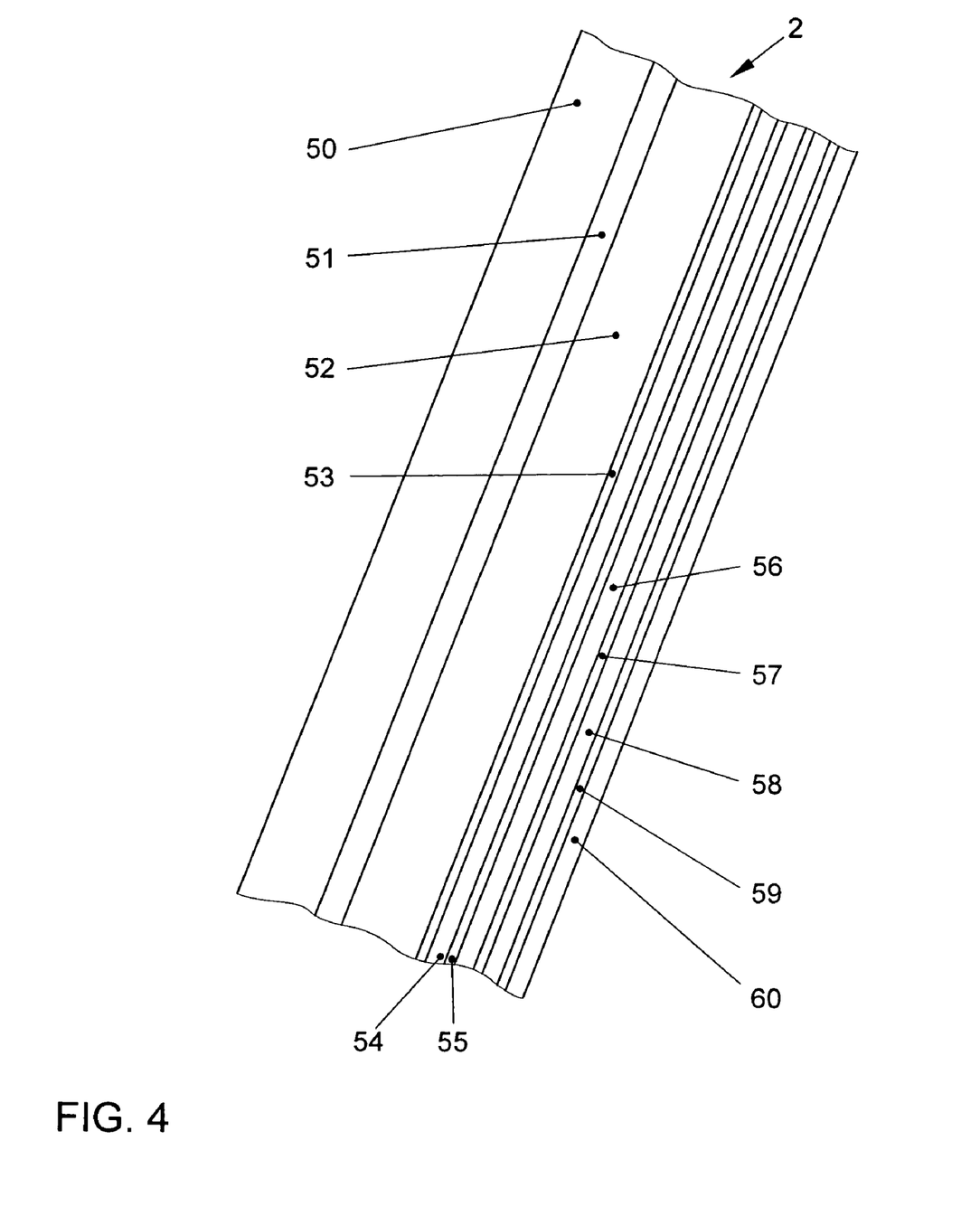
FIG. 4 shows a cross section of an example of embodiment of a windshield.

FIG. 4 shows a cross section of an example of embodiment of the windshield 2. The windshield 2 includes an outer glass layer 50, and inner glass layer 52 and a PVB layer 51 located between the outer glass layer 50 and the inner glass layer 52. The PVB layer 51 is located on the side of the outer glass layer 50 facing toward the interior of the motor vehicle 1 and on the side of the inner glass layer 52 facing away from the interior of the motor vehicle 1. On the side of the inner glass layer 52 facing toward the interior of the motor vehicle 1 there is a UV filter layer 54 connected to the inner glass layer 52 via a pressure-sensitive adhesive 53 for filtering out the UV light.

On the side of the UV filter layer 54 facing toward the interior of the motor vehicle 1 a light emission layer 56 connected to the UV filter layer 54 via a pressure-sensitive adhesive 55 and forming a fluorescent layer is applied for emitting visible light when UV light is beamed onto the light emission layer 56. Such a fluorescent layer may be for example a base layer doped with a fluorescent red, green and/or blue dye, made e.g. of polyvinyl butyral (PVB), polyurethane (PU) or mylar. The light emission layer 56 may also be a stack of fluorescent layers. Such a stack may for example include a base layer doped with a fluorescent red dye, made e.g. of polyvinyl butyral (PVB), polyurethane (PU) or mylar, followed by a base layer doped with a fluorescent green dye, made e.g. of polyvinyl butyral (PVB), polyurethane (PU) or mylar and followed by a base layer doped with a fluorescent blue dye, made e.g. of polyvinyl butyral (PVB), polyurethane (PU) or mylar.

At least on the passenger side there is a polymer layer 58 with holographic gratings on the side of the light emission layer 56 facing toward the interior of the motor vehicle 1 that is connected to the light emission layer 56 via a pressure-sensitive adhesive 57. The polymer layer 58 with holographic gratings is specifically made in such a way that an image displayed on the windshield 2 on the passenger side, for example in the area 7, is visible on the passenger side but not the driver side.

On the side of the polymer layer 58 with the holographic gratings facing toward the interior of the motor vehicle 1 or on the side of the light emission layer 56 facing toward the interior of the motor vehicle 1 there is a protective layer 60 (e.g. PET) that is connected via a pressure-sensitive adhesive 59 to the polymer layer 58 with the holographic gratings or via a pressure-sensitive adhesive to the light emission layer 56.

Figure 5:
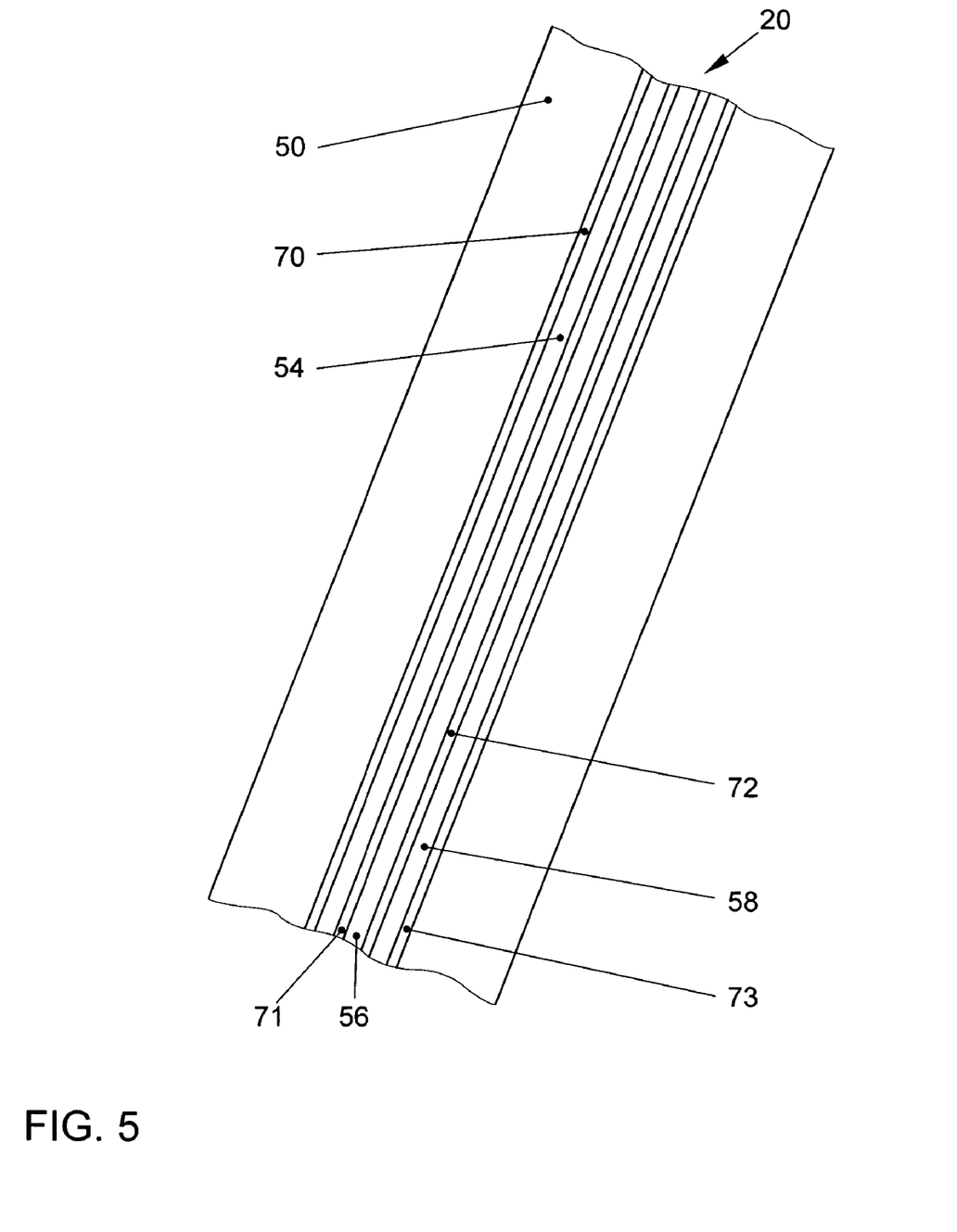
FIG. 5 shows a cross section of another example of embodiment of a windshield.

FIG. 5 shows a cross section of another example of embodiment of a windshield 20 for use instead of the windshield 2. The windshield 20 includes an outer glass layer 50 and a PVB layer 70 applied to the side of the outer glass layer 50 facing toward the interior of the motor vehicle 1. On the side of the PVB layer 70 facing toward the interior of the motor vehicle 1 there is a UV filter layer 54 connected to the PVB layer 70 for filtering out the UV light. On the side of the UV filter layer 54 facing toward the interior of the motor vehicle 1 there is a PVB layer 71. On the side of the PVB layer 71 facing toward the interior of the motor vehicle 1 there is a light emission layer 56 for emitting visible light when UV light is beamed onto the light emission layer 56. On the side of the light emission layer 56 facing toward the interior of the motor vehicle 1 there is a PVB layer 72.

At least on the passenger side there is a polymer layer 58 with holographic gratings on the side of the PVB layer 72 facing toward the interior of the motor vehicle 1. On the side of the polymer layer 58 with the holographic gratings facing toward the interior of the motor vehicle 1 there is a PVB layer 73. On the side of the PVB layer 72 facing toward the interior of the motor vehicle 1 or on the side of the PVB layer 73 facing toward the interior of the motor vehicle there is an inner glass layer 52.

Figure 6:
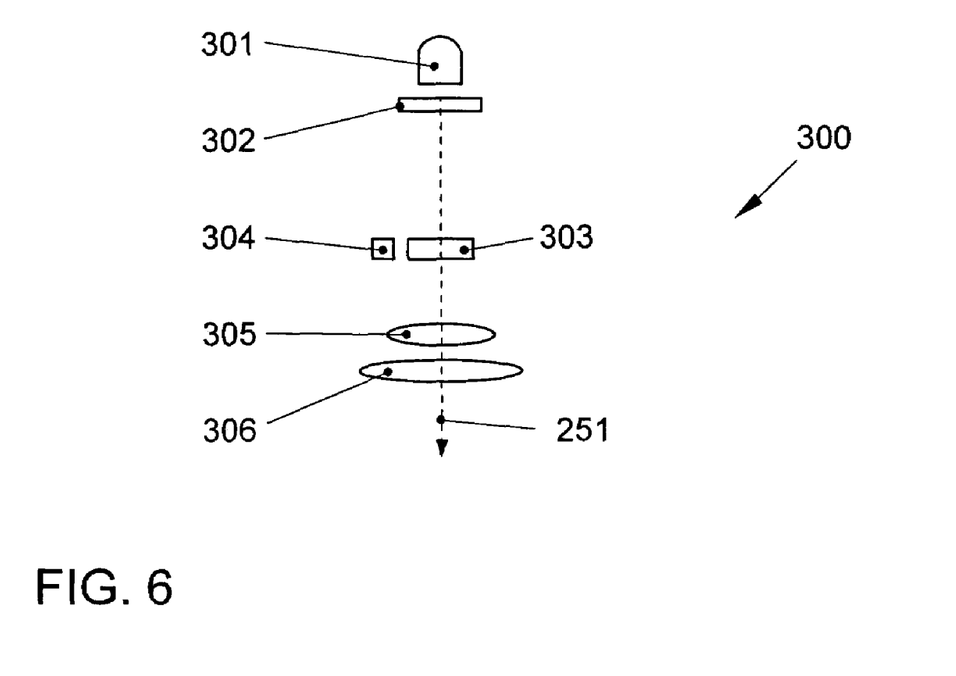
FIG. 6 shows an example of embodiment of a projector in a basic view.

FIG. 6 shows a basic view of a projector 300 as an alternative example of embodiment to the projector 200. The projector 300 includes a broadband light source 301 (wave length from 200 nm to 1,600 nm) such as a xenon or mercury lamp, and a (2-D) refractor 303. This refractor 303 may be a so-called photonic crystal or a switchable Bragg grid. Suitable refractors may for example be purchased from POC Physical Optics Corporation (www.poc.com). The refractor 303 is assigned an actuator 304 for adjusting the light path 251 as it passes through the refractor 303. When the refractor 303 is embodied as photonic crystal the direction of the light path 251 when passing through the refractor 303 is adjusted acoustically via the actuator 304. When the refractor 303 is embodied as a Bragg grid the direction of the light path 251 when passing through the refractor 303 is adjusted electrically via the actuator 304. The refractor 303 is an example of embodiment of an adjustable image generator as contemplated by the patent claims, whereby the actuator 304 is adjusted in such a way that an image can be generated from the light generated by the broadband light source 201 when passing through the refractor 303.

The projector 300 also includes a optical band filter 302 mounted in a light path 251 between the broadband light source 301 and the refractor 303 that filters out visible light and infrared light, as well as two project lenses referenced by 305 and 306 and mounted in the light path 251 behind the refractor 303.

The combination of the broadband light source 201 and the optical filter 202 in FIG. 3 or the combination of the broadband light source 301 and the optical band filter 302 in FIG. 6 may be replaced by a narrowband light source such as a solid-state pumped laser or a laser diode.

Figure 7:
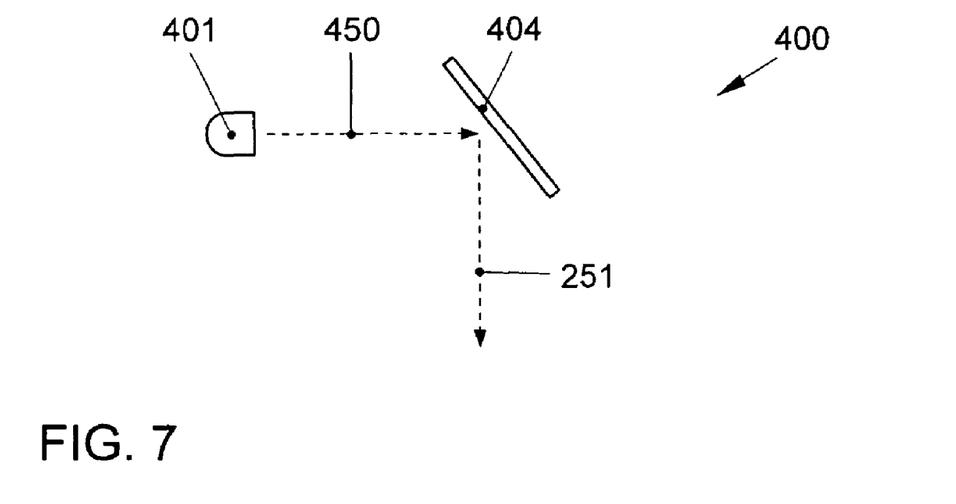
FIG. 7 shows another example of embodiment of a projector in a basic view.

FIG. 7 shows a basic view of a projector 400 as an alternative example of embodiment to the projector 200 or the projector 300. The projector 300 includes a narrowband light source 401 such as a solid-state pumped laser or a laser diode and a MEM (micro-electro-mechanical) system consisting of a number of micro mirrors to reflect light (indicated by a light path diverted in the direction of the light path 251 and referenced with number 450), whereby an image can be generated via the MEM system 404 with the light generated by the narrowband light source 401 by moving the micro mirror accordingly. The MEM system 404 is an example of embodiment for an adjustable image generator as contemplated by the patent claims. The MEM system 404 can for example take the form of a piezo-electric MEM system or an electromagnetic MEM system.

Figure 8:
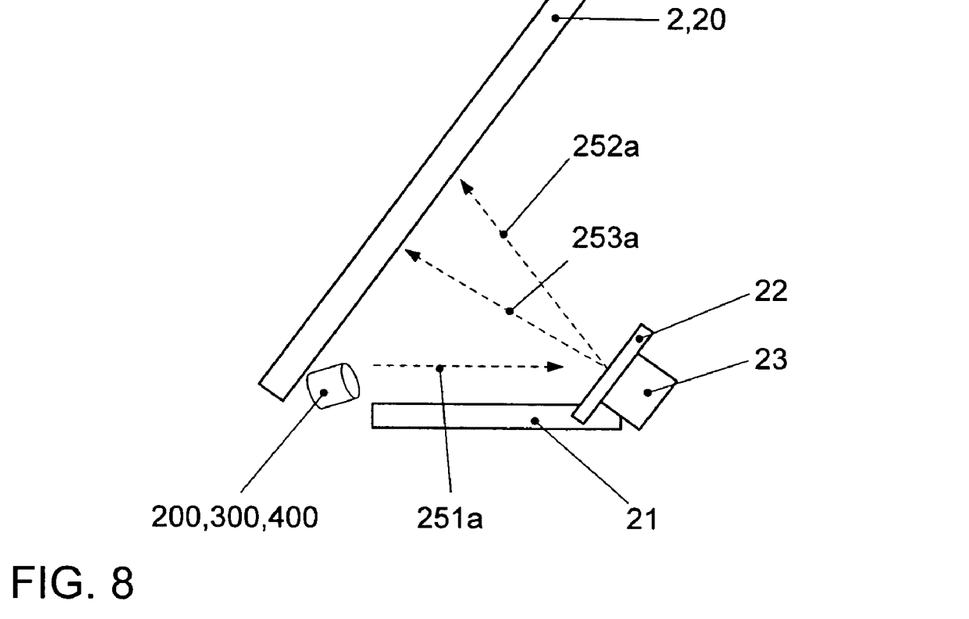
FIG. 8 shows another example of embodiment of a display device in a basic view.
Figure 9:
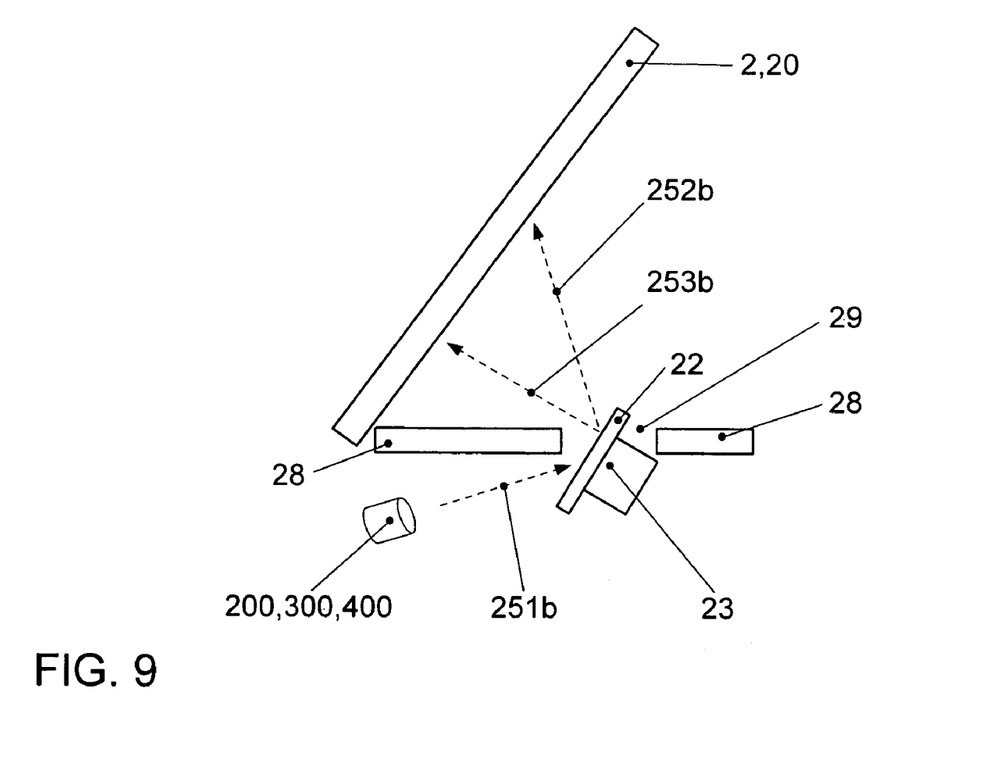
FIG. 9 shows another example of embodiment of a display device in a basic view.

FIG. 8 shows an example of embodiment of a display device in a basic view as an alternative to the display device according to FIG. 3. In this example there is a projector 200, 300 or 400 located in the lower area of the windshield 2 or 20. FIG. 9 shows an example of embodiment of a display device in a basic view as an alternative to the display device according to FIG. 3 and the display device according to FIG. 8, whereby a projector 200, 300 or 400 is mounted below an instrument panel 28 that has an opening 29.

The display device according to FIG. 3, the display device according to FIG. 8 and the display device according to FIG. 9 are configured in such a way that the light path 25, 251, 252, the light path 25, 251, 253, the light path 251$a$, 252$a$, the light path 251$a$, 253$a$, the light path 251$b$, 252$b$ and the light path 251$b$, 253$b$ between the adjustable image generators DLP processor 204, refractor 303 and MEM system 404 and the light emission layer 56 located in the windshield 2 or the windshield 20 is not less than 0.5 m, specifically not less than 0.75 m. Also, in the sample configuration the distance between the adjustable image generators DLP processor 204, refractor 303 and MEM system 404 and the reflector 22 is a least 0.25 m. In addition in the sample configuration the distance between the reflector 22 and the windshield 2 or windshield 20 is at least 0.25 m.

Using the display device according to FIG. 3, the display device according to FIG. 8 or the display device according to FIG. 9, for example an image taken with a camera 10 shown in FIG. 1 and/or an image taken with a camera 11 shown in FIG. 2, navigation information, such as an indication of direction or maps, an indication of revolutions per minute or speed can be shown on windshield 2 or windshield 20. Using the display device according to FIG. 3, the display device according to FIG. 8 or the display device according to FIG. 9, for example videos can be projected onto windshield 2 or windshield 20. Other applications include the display of environmental data such as temperature or road condition, display of traffic information, a display of information pertaining to the infotainment system, phone or air conditioning, displays with regard to the pursuit of objects or displays of warnings.

Using the adjustable image generator DLP processor 204, refractor 303 or MEM system 404, even the position of an image to be projected into windshield 2 or windshield 20 can be adjusted. It is also possible to ensure that the reflector 22 is fixed and not adjustable.

The elements and layers in the illustrations 3 to 9 are not necessarily drawn to scale for the sake of simplicity and clarity. Thus for example the magnitudes of some elements or layers are noticeably exaggerated compared to other elements and layers so as to improve the understanding of the examples of embodiment of this invention.

Reference List

| | |
|---|---|
| 1 | Motor vehicle |
| 2, 20 | Windshield |
| 3 | Rear mirror |
| 5, 6, 7 | Area |
| 10, 11 | Camera |
| 21, 28 | Instrument panel |
| 22 | Reflector |
| 23 | Micro controllers |
| 25, 251, 252, 253 | Light path |
| 251a, 252a, 253a | |
| 251b, 252b, 253b, | |
| 260, 261, 450 | |
| 29 | Opening |
| 50 | Outer glass layer |
| 51, 70, 71, 72, 73 | PVB layer |
| 52 | Inner glass layer |
| 53, 55, 57, 59 | Pressure-sensitive adhesive |
| 54 | UV filter layer |
| 56 | Light emission layer |
| 58 | Polymer layer with holographic gratings |
| 60 | Protective layer |
| 200, 300, 400 | Projector |
| 201, 301 | Broadband light source |
| 202, 302 | Optical band filter |
| 203 | Lens |
| 204 | DLP processor |
| 205, 206, 305, 306 | Projection lens |
| 220 | Dotted-line circle |
| 303 | Refractor |
| 304 | Actuators |
| 401 | Narrowband light source |
| 404 | MEM system |

What is claimed is:

1. A display device for a vehicle, comprising:
    a transparent window with a light emission layer for emitting visible light when light is beamed onto the light emission layer and a layer with holographic gratings applied to a side of the light emission layer facing the interior of the motor vehicle;
    a light source for beaming light onto the window;
    a reflector mounted in a light path between the light source and the window to reflect the light generated by the light source; and
    an adjustable image generator located in the light path between the light source and the reflector.

2. A display device according to claim 1, wherein the light path between the adjustable image generator and the light emission layer is not less than 0.5 m.

3. A display device according to claim 1, wherein an image with an area of more than 50 cm$^2$ can be generated on the window.

4. A display device according to claim 1, wherein the reflector is mounted at a distance of at least 0.25 m from the adjustable image generator.

5. A display device according to claim 4, wherein the reflector is mounted at a distance of at least 0.25 m from the light emission layer.

6. A display device according to claim 1, wherein the reflector is mounted at a distance of at least 0.25 m from the light emission layer.

7. A display device according to claim 1, wherein the display device is configured in such a way that essentially invisible light from the light source can be beamed onto the light emission layer.

8. A motor vehicle, comprising:
    a windshield with a light emission layer for emitting visible light when light is beamed onto the light emission layer and a layer with holographic gratings applied to a side of the light emission layer facing the interior of the motor vehicle;
    a light source for beaming light onto the windshield;
    a reflector mounted in a light path between the light source and the windshield to reflect light generated by the light source; and
    an adjustable image generator located in the light path between the light source and the reflector, wherein the sum of the distance between the adjustable image generator and the reflector and the distance between the reflector and the light emission layer is not less than 0.5 m.

9. A motor vehicle according to claim 8, wherein an image with an area of more than 50 cm$^2$ can be generated on the windshield.

10. A motor vehicle according to claim 8, wherein essentially invisible light can be beamed from the light source onto the light emission layer.

11. A motor vehicle, comprising:
    a windshield with a light emission layer for emitting visible light when light is beamed onto the light emission layer and a layer with holographic gratings applied to a side of the light emission layer facing the interior of the motor vehicle;
    a projection arrangement suitable for projecting essentially an image covering an area of the windshield visible to a passenger or the driver of the motor vehicle.

12. A motor vehicle according to claim 11, wherein the projection arrangement includes an adjustable image generator.

13. A motor vehicle according to claim 11, wherein the projection device includes a light source for generating light.

14. A motor vehicle according to claim 12, wherein the projection device also includes a reflector to reflect light generated by the light source.

15. A motor vehicle according to claim 13, wherein the projection device also includes an adjustable image generator located in a light path between the light source and the reflector.

16. A motor vehicle according to claim 11, wherein essentially invisible light can be beamed onto the light emission layer using the projection arrangement.

* * * * *